May 23, 1933.  H. F. SMITH  1,911,002

REFRIGERATING APPARATUS

Filed Sept. 30, 1931  2 Sheets-Sheet 1

INVENTOR
Harry F. Smith
BY
Spencer, Hardman, and Fehr
HIS ATTORNEYS.

May 23, 1933.                H. F. SMITH                1,911,002
                         REFRIGERATING APPARATUS
                         Filed Sept. 30, 1931        2 Sheets-Sheet 2

INVENTOR
Harry F. Smith.
BY
Spencer, Hardman, and Feli.
HIS ATTORNEYS.

Patented May 23, 1933

1,911,002

UNITED STATES PATENT OFFICE

HARRY F. SMITH, OF DAYTON, OHIO, ASSIGNOR TO FRIGIDAIRE CORPORATION, OF DAYTON, OHIO, A CORPORATION OF DELAWARE

REFRIGERATING APPARATUS

Application filed September 30, 1931. Serial No. 566,032.

This invention relates to refrigerating apparatus and particularly to apparatus for and methods of controlling such apparatus.

This invention is particularly directed to refrigerating systems of the type in which operations of the refrigerant liquefying and circulating unit are controlled in response to the conditions of the refrigerating fluid contained in the system. A typical example of such a refrigerating system is the compressor-condenser-expander type of system in which a control device, responsive to the pressure of the refrigerant in the system, is employed to control starting and stopping of the means for driving the compressor of the system. Another example of such a refrigerating system is the absorption type of system in which a control device, responsive to pressures of the refrigerant in the system, is utilized to control the heating and cooling cycles of operation of the system or the amount of heat or cooling fluid being supplied to certain elements thereof.

In refrigerating systems of the type exemplified the control device employed therein is normally set to operate between certain pressure limits. Since pressures of refrigerating fluids normally increase or decrease uniformly and correspondingly with temperatures thereof, the control device of such a refrigerating system causes the system to maintain the temperature of the evaporator thereof between predetermined limits. Should the temperature outside the compartment of the refrigerator in which the evaporator is located increase abnormally the control of the system will cause operation of the refrigerant liquefying and circulating unit until it has reduced the evaporator to the normal low pressure and consequently to the low normal temperature limit at which it is set and will then stop operation of the unit. Since heat leaks through walls of the compartment and is transferred to the evaporator more rapidly during abnormal increase in temperatures outside the compartment the pressure of refrigerant in the system will rise very quickly, thus again causing the control switch to start operation of the unit. It is apparent that under such conditions the refrigerant liquefying and circulating unit will cycle very frequently and will reduce the evaporator and consequently the compartment being cooled thereby only to the temperature corresponding to the low pressure at which the control is set to stop operation of the unit. This frequent starting and stopping of the refrigerant liquefying and circulating unit causes abnormal wear on the control switch and all other operating elements of the system thus necessitating their replacement or repair after the system has been in operation for a short period of time.

The object of the present invention is to provide an improved refrigerating system which normally maintains the desired refrigerating temperature in a compartment for general refrigerating purposes and which will provide increased or decreased cooling automatically when it is desired, such as when temperatures on the exterior of the refrigerated compartment increases or decreases abnormally.

In carrying out this object, it is a further object to control the refrigerating system normally in response to normal requirements of the system and to control the system to provide increased cooling in direct response to abnormal increases in temperature outside the compartment being refrigerated.

Another object of the invention is to provide an improved control system for a refrigerating machine, the controlling system including means for automatically effecting the operation of such system in response to climatic conditions outside of the refrigerated compartment.

Further objects and advantages of the present invention will be apparent from the following description, references being had to the accompanying drawings, wherein a preferred form of the present invention is clearly shown.

Figure 1:
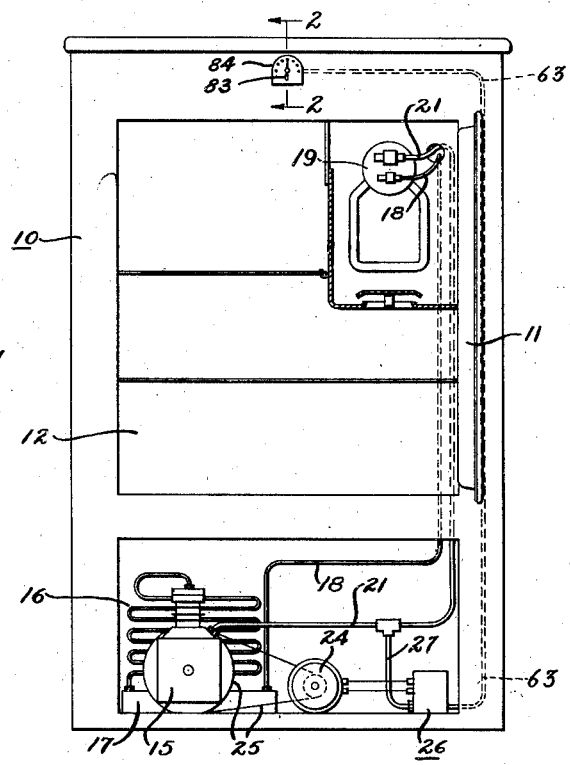
Fig. 1 shows a mechanical refrigerating apparatus installed in a cabinet and having my invention embodied therein.

For the purpose of illustration, I have shown in the drawings a refrigerating system of the compressor-condenser-expander type. My invention is, however, equally applicable to other types of systems such as absorption refrigerating systems as hereinbefore pointed out. Referring to the drawings, Fig. 1 discloses a refrigerating system installed in a refrigerator cabinet 10 of the household type. The door 11 which permits access to the insulated storage compartment 12 to be refrigerated being shown in open position. The door or front cover employed to enclose the refrigerant liquefying unit of the system in a lower compartment of the cabinet 10 is shown as being removed from the cabinet. The refrigerating system includes a compressor 15 for compressing the refrigerant, preferably sulphur dioxide, and for forwarding it to a condenser 16 where it is liquefied and collected in a receiver 17. A supply conduit 18 supplies liquid refrigerant from the receiver 17 to a cooling unit or evaporator 19, disposed in the insulated compartment 12 to be refrigerated, where the liquid refrigerant vaporizes because of the absorption of heat from the compartment and is returned to the compressor 15 through a gaseous refrigerant return conduit 21. The evaporator 19 may be of any suitable form, such, for example, as that shown in the patent to R. G. Osborn 1,556,708 issued October 13, 1925. Liquid refrigerant entering the evaporator 19 through conduit 18 is maintained at a substantially constant level therein by a float control valve substantially as shown in said patent to Osborn.

The actuating means for the compressor 15 preferably comprises an electric motor 24 connected by pulley and belt means 25 to the compressor. Pressure responsive control mechanism 26 is connected to the gaseous refrigerant return conduit 21 through the conduit 27 for opening and closing the electric circuit leading to the motor 24 which drives the compressor 15 to provide alternating operating and idling periods of the compressor according to the pressure of the refrigerant in and consequently to temperature of the evaporator 19.

The pressure responsive means of the control mechanism 26 comprises a hollow metallic bellows 29 (see Fig. 3) which is sealed at the top and which is connected at the bottom by means of the conduit 27 to the return conduit 21 of the refrigerating system. An operating lever 32 pivoted on ears 33 of the elevated platform 34 follows the movements of the bellows 29 by being pivoted thereto by a pin 35. A double lever 36 straddles the lever 32 and is pivoted thereto by the pin 37. One end of the lever 32 is connected to one of the switch contacts 38 by a link 39. The cooperating switch contact 41 is mounted on the base 42 of the control mechanism. A snap action of the contact 38 with respect to the contact 41 is provided by a cam system which includes a hardened steel nose 44, fastened to the other end of the lever 36, against which a hardened steel roller 45 is biased by a carrier 46 and a spring 47. As the pressure builds up within the flexible metallic bellows 29, the latter expands and since the lever 32 is pivoted to this bellows by the pin 35 and fulcrumed to the supporting frame of the device as at 33, it is evident that the bellows will raise the operating lever 32.

The upward movement of the lever 32 is resisted by a yieldable adjustable system comprising a coil spring carried within an adjustable casing 49 and bearing against a plunger 51 which acts against the extremity 52 of the lever 32. When the pressure decreases and the bellows 29 collapses, the downward movement of the lever will be resisted by a coil spring 54 whose tension may be regulated by nuts 55 carried on a vertical threaded rod 56 pivoted to lever 32. A balancing spring 57 adjusted by the nuts 58 is used on the opposite side of the base 42 of the device for resisting the tension of the spring 54.

The springs 54 and 57 and the resilient adjusting system comprising the plunger 51 and the adjusting cap 49 are provided for preferably so adjusting to produce what may be termed a normal predetermined adjustment, that is for maintaining a pressure corresponding to a particular temperature which is ordinarily suitable under normal conditions for every day operation of the evaporator in which the system is used.

The extremity 52 of the lever 32 bears against the plunger 51 only on the upward action of lever 32. After lever 32 begins to descend the extremity 52 does not touch the plunger 51. Thus the plunger 51 effects the starting pressure but not the stopping pressure. The cap 49 is therefore a starting adjustment. The temperature provided by the mechanism thus described is sufficient to cool to the desired temperature, foodstuffs ordinarily stored in the compartment of the cabinet cooled by the evaporator. The pressure responsive control mechanism including the parts heretofore described is substantially identical to the control mechanism disclosed in the patent to Otto M. Summers No. 1,802,486, issued April 28, 1931.

Since it is desirable to cause longer operating periods of the refrigerant liquefying and circulating unit instead of a plurality of short operating periods to reduce the temperature of the evaporator, and consequently the compartment in which it is mounted, below their normal low temperature limit in the event temperatures increase abnormally on the exterior of the cabinet I have provided means for modifying the operation of the refrigerant liquefying unit. In the present embodiment, I modify the action of the control means to effect modification of operations of the refrigerant liquefying and circulating unit. The control means is usually adjusted at the factory, or in the field by experienced service men, for such normal operation by suitably tensioning the springs 54 and 57 as well as the resilient adjusting system 49 and 51 and in such condition the lever 32 will have its upward and downward movement resisted so that it will open and close the circuit of the driving motor 24 only at the maximum and minimum pressure temperature points for which the tension corresponds.

By interposing a resistance to the descent of the lever 32, the operation of the switch contacts will be delayed so that the system will continue operating for a longer period of time, thus prolonging the cooling cycle of the system. Likewise, if the resistance to the descent of the lever 32 is increased, it will require a greater effort on the part of the diaphragm 29 to pull the lever down into contact breaking position. (The descent of the lever 32 causing the raising of contact 38 away from the contact 41, thus breaking the circuit.)

According to the present invention automatic means is provided for interposing such a resistance. To this end a thermostat bulb 61 containing a suitable fluid is mounted preferably on the exterior of the refrigerator cabinet so as to be responsive to temperatures outside the cooling compartment 12 of the cabinet 10. This thermostat bulb 61 is connected by means of a conduit 63 to an auxiliary bellows 65 fastened on base 42 of control switch 26 (see Fig. 3). I preferably desire to employ a fluid capable of expanding greatly due to temperature changes and to maintain such fluid in a liquid state at all times so as to obtain the advantage of the force or power developed by expansion of a liquid. In order to obtain this advantage it is necessary to completely fill the bulb 61, conduit 63 and bellows 65 with such a liquid to produce the desired results. There are many fluids suitable for such purpose, any of which may be employed. For example, fluids such as hydrocarbon oils, ether, alcohol or chloroform have a relatively high coefficient of expansion in response to temperature changes. Any suitable method may be employed for filling or charging the bulb 61, conduit 63 and bellows 65 with the fluid to be used and such method or methods are not believed to need a detailed description herein. The bulb 61, conduit 63 and bellows 65 are so proportioned that the fluid to be used after being sealed therein will not expand bellows 65 under normal temperatures existing in rooms in which the refrigerator is located.

Figure 3:
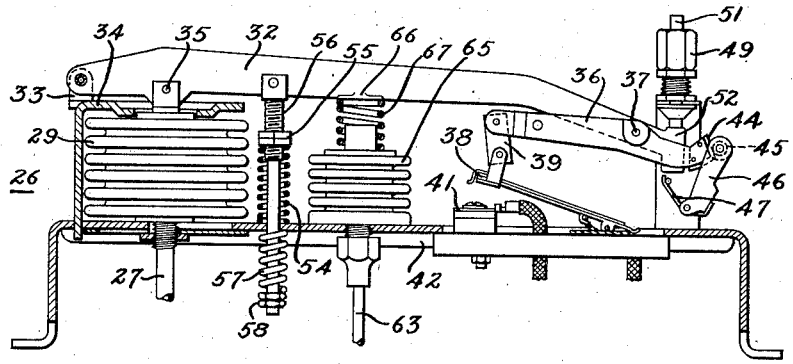
Fig. 3 is a sectional view of a control switch taken on the line 3—3 of Fig. 5 illustrating one embodiment of the invention to which the element shown in Fig. 2 is adapted to be connected.
Figure 4:
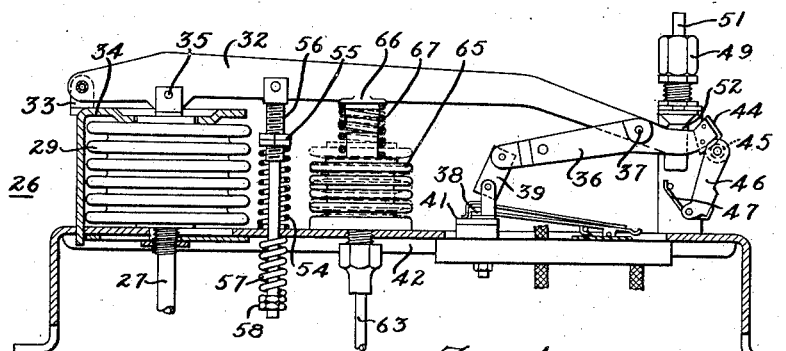
Fig. 4 is a sectional view showing the switch disclosed in Fig. 3 in a different position.
Figure 5:
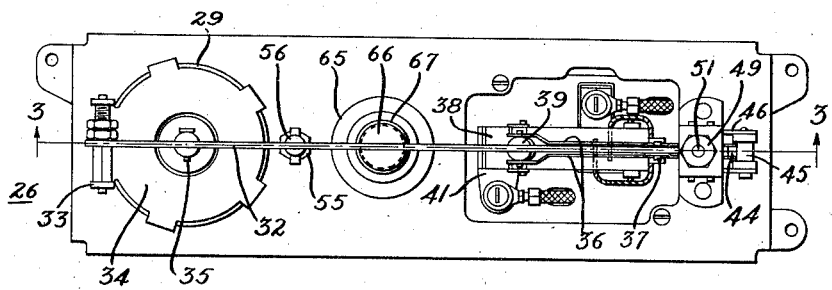
Fig. 5 is a top plan view of the control switch shown in Figs. 3 and 4.

A resistance means in the form of a spring 67 is interposed between the auxiliary bellows 65 and a bearing portion 66 formed on the lower side of lever 32 of control switch 26. This spring 67 may contact with lever 32 at all times if desired but its tension must, during normal operating conditions, be overcome by the spring 57. Therefore during normal operation the bellows 65 and spring 67 are ineffective for resisting the downward movement of switch lever 32. When the temperature increases abnormally outside the refrigerator compartment 12 liquid within the bulb 61, conduit 63 and bellows 65 will expand and cause movement or expansion of the movable member or auxiliary bellows 65 into the position shown by the dotted lines in Fig. 4 of the drawings. Movement of the bellows 65 tends to compress the spring 67 between the upper end of the bellows 65 and lever 32 thus the spring exerts increased force or tension against lever 32 and forces this lever upwardly so that the contacts 38 and 41 of switch 26 will be closed to start the motor 24. If the contacts 38 and 41 are already in closed position as shown in Fig. 4 of the drawings the bellows 65 and spring 67 will keep them in this position until the temperature in the compartment 12 has been reduced to the desired low limit to cause bellows 29 of control switch 26 to overcome the force exerted by springs 57 and 67 so as to operate the switch 26 into contact open position as shown in Fig. 3 of the drawings. It is apparent that operation of the means just described for modifying the action of the control switch will cause longer operating periods of the compressor and that by operating the compressor 15 continuously or over longer periods of time it is apparent that the temperature within compartment 12 will be maintained at a constant low temperature irrespective of abnormal increases of temperature within the room in which the refrigerator is located. Thus the refrigerating system is rendered more efficient by the fact that it operates normally when the temperature in the room is normal and when the temperature of the room increases the system will maintain a constant low temperature in the refrigerator without abnormal starting and stopping operations.

Figure 2:
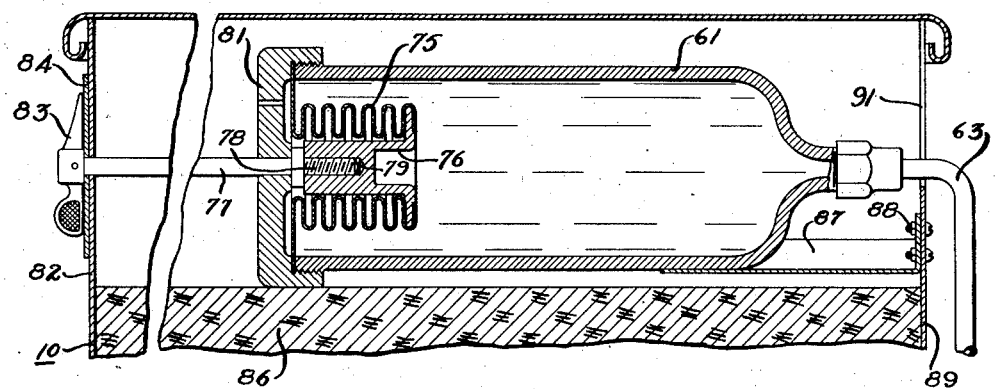
Fig. 2 is an enlarged sectional view taken on the line 2—2 of Fig. 1 showing a combined manually and automatically actuated device for modifying the action of the control switch of the system.

Occasionally it occurs that the temperature of the evaporator or the temperature within the insulated food storage compartment 12 is desired to be lowered below their normal low temperature for a predetermined period of time irrespective of the temperature prevailing on the exterior of the compartment. For instance, this is desirable when water or other substances are placed in trays and inserted in the evaporator to be congealed or frozen and also when a quantity of bottled beverages are placed in compartment 12 to be rapidly cooled in order that the contents thereof may be served within a short period of time. I have provided means for manually modifying the action of the control switch to cause longer operating periods of the refrigerant liquefying and circulating unit in order to accomplish this need or desirability in such refrigerating apparatus. This means in the preferred form is associated with the bulb 61. However, it is to be understood that such manually operated means may be a separate element from the bulb 61 and may be located wherever desired and connected to the conduit 63. I have shown the manually operated means as including an expansible and contractible bellows 75 located within the bulb 61. The bellows 75 serves as a seal for the bulb 61 and has its free end secured to a member 76 which extends into the bellows. Member 76 may engage or may be slightly spaced from the inner portions of the corrugations of the bellows 75 to prevent its collapsing or fracturing during expansion of liquid contained in the bulb 61. A rod 77 has a threaded end portion 78 communicating with threads 79 in member 76. Rod 77 extends through a cap 81 which cap firmly clamps bellows 75 to the bulb 61 in order to seal the liquid within the bulb 61. The end of rod 77 opposite the threaded end 78 thereof extends through the front wall 82 of cabinet 10 and has a lever or pointer 83 secured thereto (see Fig. 2). Lever or pointer 83 associates with a dial 84 which indicates the amount of modification of action of the control switch 26 of the system. When it is desired to cause longer operating periods of the refrigerant liquefying and circulating unit the lever or pointer 83 is manipulated to rotate rod 77 and the threaded portion 78 of rod 77 causes member 76 and bellows 75 to move inwardly into the bulb 61. Obviously liquid contained in bulb 61 will tend to be compressed by such movement of the bellows 75 and will therefore flow from the bulb 61 into conduit 63 and thence to the auxiliary bellows 65 mounted on the control switch 26. Bellows 65 is thereby expanded and spring 67 is compressed between this bellows and the control switch lever 32. Compression of spring 67 causes this spring to oppose a greater force or resistance to the downward movement of control switch lever 32. The action of switch 26 is thereby manually modified in the same manner as that heretofore described with reference to the expansion of liquid in bulb 61 in response to temperature changes outside the insulated compartment 12.

In the present embodiment of the invention I have shown the bulb 61 as being disposed above the insulation 86 which surrounds the lining of compartment 12. A bracket 87 is secured to the bulb 61 and is fastened in any suitable manner such as by screws 88 to the rear wall 89 of the cabinet 10. The bracket 87 prevents rotation of bulb 61 during turning of the rod 77. In this form of the invention it is desirable to provide openings in the rear wall 89 of cabinet 10 so as to permit bulb 61 to communicate with the air within the room in which the cabinet 10 is located. Therefore a slot 91 is provided in the rear wall 89 of cabinet 10. However, additional openings can be provided in the rear wall 89 of cabinet 10 if desirable. Slot 91 not only permits air within the room to communicate with bulb 61 but also provides for the assembly or removal of bulb 61, conduit 63 and bellows 65 as a unit.

The automatic thermostatic element 61 together with the manually operated bellows 75 for modifying the action of the control switch 26, and consequently operations of the refrigerant liquefying and circulating unit, may operate or be actuated independently of one another and independently of the normal adjustable setting of the control switch 26. Thus it is apparent that I have provided an improved refrigerating system wherein the action of the control switch of the system can be temporarily modified to cause continuous or longer operating periods of the refrigerant liquefying elements of the system. The combination of the elements of my system for modifying the action of the control switch of the system, either manually or automatically in response to temperature outside the compartment being refrigerated provides an improved refrigerating system which will operate efficiently under various conditions. My improved refrigerating system will automatically maintain a uniform low temperature in a refrigerated compartment, irrespective of abnormal increases in temperature on the exterior thereof, while at the same time providing means whereby increased cooling of the evaporator may be effected when water or other comestibles are to be quickly frozen or when bottled beverages are placed in the refrigerator to be rapidly chilled prior to serving. By accomplishing the foregoing features without the necessity of frequently starting and stopping the refrigerant liquefying and circulating unit the life of operating parts of the system is prolonged.

While the form of embodiment of the invention as herein disclosed, constitutes a preferred form, it is to be understood that other forms might be adopted, all coming within the scope of the claims which follow.

What is claimed is as follows:

1. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, and means for automatically modifying the operation of the control means in response to temperature outside said compartment.

2. Refrigerating apparatus comprising in combination, a compartment to be cooled, an evaporator disposed in said compartment, means for cyclically circulating a refrigerating medium through said evaporator, control means for automatically controlling the circulating cycles of said first named means including means for adjusting same to normally maintain a predetermined mean temperature of the evaporator, and means operable automatically and independent of the adjustable means for modifying the operation of said control means, said last named means being responsive to temperatures outside said compartment.

3. Refrigerating apparatus comprising in combination, a compartment to be cooled, an evaporator disposed in said compartment, means for cyclically circulating a refrigerating medium through said evaporator, control means for automatically controlling the circulating cycles of said first named means including means for adjusting same to normally maintain a predetermined mean temperature of the evaporator, means operable automatically in response to temperatures outside said compartment for modifying the operation of said control means, and manually operable means for modifying the operation of said control means, the said automatic means and said manually operated means for modifying operations of the control means being operable independently of the adjustable means of said control means.

4. Refrigerating apparatus including a compartment and mechanism for producing refrigeration therein; control means for automatically controlling said mechanism for maintaining the temperature within said compartment within predetermined limits; auxiliary means for modifying the action of said control means to change the lower temperature limit within said compartment while maintaining the upper temperature limit unchanged, said auxiliary means being operated automatically in response to temperatures outside said compartment being refrigerated.

5. The method of maintaining a substantially uniform low temperature in an insulated compartment which comprises, vaporizing a liquid refrigerating medium in an evaporator disposed in said compartment, liquefying the vaporized refrigerant in an apparatus disposed outside said compartment, normally controlling cyclical operations of the liquefying apparatus in response to conditions of the evaporator, and modifying the action of the cyclical control of said liquefying apparatus in direct response to temperature changes outside said compartment.

6. The method of maintaining a substantially uniform low temperature in an insulated compartment which comprises, vaporizing a liquid refrigerating medium in an evaporator disposed in said compartment, liquefying the vaporized refrigerant in an apparatus disposed outside said compartment, normally controlling cyclical operations of the liquefying apparatus in response to conditions of the evaporator, and modifying the action of the cyclical control of said liquefying apparatus in direct response to abnormal high temperatures outside said compartment.

7. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, means on said control means for modifying the action thereof to cause the temperature of said evaporator to be lowered below its normal predetermined mean temperature limit, and means responsive to temperature outside said insulated compartment for automatically causing said last named means to become effective.

8. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, resistance means on said control means for modifying the action thereof to cause the temperature of said evaporator to be lowered below its normal predetermined mean temperature limit, and a thermostat responsive to temperature outside said insulated compartment and having a portion thereof communicating with said resistance means for automatically causing said resistance means to become effective.

9. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, resistance means on said control means for modifying the action thereof to cause the temperature of said evaporator to be lowered below its normal predetermined mean temperature limit, a movable member on said control means engaging said resistance means, and means responsive to temperature outside said insulated compartment for automatically moving said member to cause said resistance means to become effective.

10. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, resistance means on said control means for modifying the action thereof to cause the temperature of said evaporator to be lowered below its normal predetermined mean temperature limit, an expansible and contractible member on said control means engaging said resistance means, and means responsive to temperature outside said insulated compartment for automatically expanding and contracting said member to cause said resistance means to become effective.

11. Refrigerating apparatus comprising in combination, an insulated compartment to be cooled, an evaporator disposed in said compartment, means for circulating refrigerant medium through the evaporator, control means for automatically controlling the circulating means to maintain said evaporator at a normal predetermined mean temperature, resistance means on said control means for modifying the action thereof to cause the temperature of said evaporator to be lowered below its normal predetermined mean temperature limit, an expansible and contractible member on said control means engaging said resistance means, and a thermostat connected to said member and responsive to temperature outside said insulated compartment for automatically expanding and contracting said member to cause said resistance means to become effective.

In testimony whereof I hereto affix my signature.

HARRY F. SMITH.